United States Patent Office 3,035,895
Patented May 22, 1962

3,035,895
PREPARATION OF HIGH-DENSITY, COMPACTIBLE THORIUM OXIDE PARTICLES
Kenneth H. McCorkle, Knoxville, Alfred T. Kleinsteuber, Oak Ridge, Charles Edmund Schilling, Knoxville, and Orlen C. Dean, Oak Ridge, Tenn., assignors to the United States of America as represented by the United States Atomic Energy Commission
No Drawing. Filed Nov. 25, 1960, Ser. No. 71,843
8 Claims. (Cl. 23—14.5)

Our invention relates to thorium oxide and more particularly to methods for the preparation of high-density, compactible thorium oxide particles.

Thorium is useful as a source of fissionable material, thorium-233 being converted to fissionable uranium-233 by irradiation with thermal neutrons. Thorium may be employed in the form of thorium oxide contained in heterogeneous fuel elements disposed in the neutron flux field of a nuclear reactor.

One of the problems involved in the use of thorium oxide in this manner is the provision of an economical method of preparing thorium oxide particles suitable for convenient fabrication into high-density heterogeneous fuel elements. It is particularly desired to prepare particles capable of being fabricated by means of vibratory compaction techniques in which the particles are compacted to a high density in a suitable fuel element casing such as a metallic cylinder. High-density thorium oxide particles with a wide range of particle sizes are required in order to obtain a high-density compacted mass. For example, effective compaction is obtained by employing a mixture comprising 60 weight percent large particles (+16, −10 mesh, 1.0 to 1.7 millimeters), 15 weight percent medium-sized particles (+70, −100 mesh) and 25 weight percent small particles (−200 mesh). Suitable methods have been available for preparation of small and medium-sized particles, e.g., by oxalate precipitation and calcination and by flame calcination of a thorium nitrate solution. These methods, however, are ineffective for preparing millimeter-size particles.

High-density particles of the desired large size have been prepared in small quantities by fusion techniques in which the oxide is heated to its melting point. This method is impractical because of the extremely high temperatures required. In addition, a radiation hazard is created in this method by vaporization of alpha-emitting daughters of uranium-232 and thorium-228. In order to provide for economical large-scale production of thorium oxide fuel a relatively low-temperature method utilizing simple, easily maintained equipment is desired. Because of the radioactivity encountered, particularly in the case of reprocessed, irradiated material, the method should also be amenable to remote, heavily shielded operation.

Thorium oxide may also be employed in combination with uranium oxide in heterogeneous nuclear reactor applications, with the combined oxides providing both fuel and fertile material. Combined oxides containing up to 8 weight percent uranium, and particularly 4 to 6 weight percent uranium, are desired for this purpose.

It is, therefore, an object of our invention to provide a method for the preparation of millimeter-size, high-density thorium oxide particles.

Another object is to provide an economical method suitable for the preparation of large quantities of high-density thorium oxide particles.

Another object is to provide a method for the preparation of large thorium oxide particles suitable for fabrication into high-density shapes by means of vibratory compaction.

Another object is to provide a method for the preparation of large, high-density thorium-uranium oxide particles.

In accordance with our invention, millimeter-size, high-density thorium oxide particles are prepared in a process comprising forming a gel comprising thorium oxide containing approximately 3.5 to 7 weight percent residual volatiles, said residual volatiles comprising substantially equivalent proportions of water and nitrate, by drying a nitrate-containing thorium oxide sol at a temperature from approximately 50° C. to 100° C., slowly heating said dried gel to a temperature of at least approximately 450° C. and rapidly calcining the resulting heated solids at a temperature of at least approximately 1150° C. Large, high-density thorium oxide particles suitable for vibratory compaction in combination with smaller particles are obtained. This process is easily controlled and may be conducted in simple equipment since the process steps are carried out at relatively low temperatures. Thorium oxide for nuclear reactor applications may thus be economically prepared on a large scale by this process. Combined thorium-uranium oxides containing up to 8 weight percent uranium may also be prepared in the form of large, high-density particles by providing uranium in the thorium oxide gel.

We have found that the hitherto unattainable combination of high density and large particle size may be obtained in a relatively low temperature process by controlling the volatile nitrate and water content of a thorium oxide gel prepared by drying a nitrate-containing sol and by control of the temperature in the sol drying, denitration and calcination steps. Although our invention is not to be understood as limited to a particular theory, it is postulated that the presence of a critical quantity of nitrate and/or intimately bound water lowers the oxide crystallite sintering temperature and provides for sintering of large oxide fragments to high density during calcination.

Under the conditions employed for incorporation of the required amount of nitrate into the gel a substantially equivalent amount of water is also contained. Determination of the amount of nitrate and water present in the gel is most readily effected by the loss-on-ignition analytical method wherein the gel is heated to an elevated temperature to volatilize these constituents and the weight loss is measured. This feature of our invention is, therefore, referred to herein in terms of the total volatile nitrate and water content, which may be conveniently measured by this means, rather than in terms of nitrate content alone. The volatile nitrate and water content may comprise 30 to 70 weight percent of either constituent. The water content of this fraction includes only intimately bound water which is held in the gel upon heating to a temperature of 135° C. and does not include superficially held water lost upon heating to this temperature. It is to be understood that a minor proportion of the nitrogen contained in the gel may be in the form of other nitrogen-oxygen species such as nitrite. These nitrogen-oxygen species are volatilized along with the nitrate and water and have no independently distinguishable effect upon the process. The volatile fraction is, therefore, referred to in terms of nitrate and water only. A volatile nitrate and water content within the range of 3.5 to 7 weight percent may be employed, and the preferred volatile content varies with the method of preparing the sol from which the gel is obtained, as will be described in detail below.

Formation of a thorium oxide gel is effected by drying a nitrate-containing thorium oxide sol at a temperature from approximately 50° C. to 100° C. Under these conditions the sol forms a gel, and the gel breaks into fragments upon completion of the drying. Completion of drying is evidenced by a physical appearance of dryness of the gel fragments. The critical residual volatile nitrate and water content in the gel is obtained by drying the sol at this temperature and by control of the conditions employed in sol preparation. The properties of thorium oxides prepared by different methods vary considerably; consequently, the conditions employed in sol preparation are likewise varied, depending on the type of starting material. The starting oxide must be dispersible; that is, the oxide must be capable of being degraded to the extremely fine, submicron-size particles required for formation of a sol upon heating in water or an aqueous nitrate system. Certain oxides such as high-temperature calcined oxides are not sufficiently dispersible and are thus unsuitable for sol preparation. Examples of suitable starting oxides are oxides prepared by calcination of thorium oxalate at a temperature from approximately 650° C. to 800° C., oxides prepared by steam or air denitration of thorium nitrate and hydrous precipitated thorium oxide.

A sol may be prepared from thorium oxide obtained by calcination of thorium oxalate by repeated dispersion of the oxide in an aqueous system. In the use of oxalate-source oxide it is preferred to employ oxide obtained by calcination at a temperature from approximately 650° C. to 800° C. Calcination temperatures above 800° C. result in poor dispersion, and oxide calcined below 650° C. contains carbonate, which causes foaming difficulties in sol formation. Dispersion is effected by heating the oxide initially in an aqueous nitrate system, preferably at a thorium-to-nitrate ratio from approximately 1.9:1 to 3.0:1. Lower proportions of nitrate result in slow or incomplete dispersion, and nitrate in excess of this amount is unnecessary. The resulting mixture is thoroughly agitated and heated to dryness, preferably at a temperature from approximately 125° C. to 150° C. If lower temperatures are employed the resulting solids undergo excessive off-gassing, bubbling and breaking in subsequent processing, and the product density is low. Higher temperatures cause strain cracking and decrepitation during calcination, resulting in a product of high density, but with small particle size. The concentration of thorium oxide employed in sol preparation is not critical, and any concentration sufficiently low to allow complete dispersion, e.g., 2 molar, may be employed. Nitrate ions may be supplied to the aqueous system in the form of nitric acid or thorium nitrate. The aqueous nitrate system is evaporated to dryness at the desired temperature, and the resulting solids are subjected to repeated cycles of redispersion and reevaporation until a stable sol is formed and until the desired residual volatile nitrate and water content is reached in the gel obtained by drying the sol. Formation of a sol is evidenced by failure of the dispersed solids to settle upon allowing the dispersed mixture to stand. A gel obtained by drying a sol prepared in this manner may contain up to 10 percent residual volatile nitrate and water. The volatile content is reduced to the desired level by further cycles of redispersion and reevaporation. In each cycle the dried solids are thoroughly dispersed in water by agitation and the resulting mixture is evaporated to dryness, preferably at a temperature from approximately 125° C. to 150° C. A total of 3 to 5 cycles is generally required to form a sol and attain the desired volatile nitrate and water content. A volatile nitrate and water content of 5 to 7 percent in the gel obtained by drying the sol is preferred for this material.

The thorium oxide sol may also be prepared from thorium oxide obtained by steam denitration of thorium nitrate. This method is preferred for large-scale production because of its few process steps and resulting lower cost. In this method the steam denitration temperature is controlled to produce a dispersible thorium oxide which forms a suitable sol without the repeated dispersion and evaporation steps required for oxalate-source thorium oxide. A thorium nitrate solution or hydrated thorium nitrate is contacted with steam until the desired volatile nitrate and water content in the resulting solids is reached. In this embodiment a volatile nitrate and water content within the range of 3.8 to 5.5 weight percent is preferred. In order to obtain a dispersible oxide the steam denitration temperature is kept below 400° C., and preferably within the range of 340° C. to 370° C., until 85 to 90 percent of the volatile nitrate and water are removed. A contact time of 30 minutes to one hour is required for this extent of denitration. It is then preferred to increase the temperature to approximately 385° C. and to maintain this temperature until the desired final volatile nitrate and water content is obtained, with 30 minutes to one hour again being required.

Thorium oxide obtained by thermal denitration of thorium nitrate in air may also be employed in the preparation of a thorium oxide sol. Suitable thorium oxide may be obtained by the procedure employed in steam denitration, except that air rather than steam is contacted with thorium nitrate. This method, however, is less favorable than steam denitration because the oxides of nitrogen which are given off require special treatment such as caustic scrubbing, and the product oxide particle size tends to be smaller.

Hydrous precipitated thorium oxide obtained by ammonium hydroxide precipitation of thorium hydroxide from aqueous solution is likewise suitable for preparation of the thorium oxide sol. The same procedure employed for oxalate-source thorium oxide may be employed for this material.

For the preparation of thorium-uranium oxide, uranium may be provided in the thorium oxide sol at a concentration up to 8 weight percent of the total metal content, with a concentration of 4 to 6 percent being of primary interest for nuclear reactor applications. Uranium may be supplied to the sol in the form of a soluble or dispersible compound such as ammonium diuranate, uranyl nitrate hexahydrate, uranium trioxide or hydrated uranium trioxide. The resulting mixture is agitated to disperse the uranium throughout the sol. Uranium may be supplied in oxalate-source oxides by coprecipitation of thorium and quadrivalent uranium.

The thorium oxide sol is converted to a gel by drying the sol at a temperature from approximately 50° C. to 100° C. Drying at this temperature is required to produce gel fragments which yield millimeter-size oxide particles upon calcination. Drying at this temperature also results in a residual volatile content of substantially equivalent portions of nitrate and water. The critical feature in drying the sol to form a gel is in maintaining the temperature below 100° C. until the dried sol has progressed through a pasty stage and gel fragments are formed. Temperatures over 100° C. are not harmful after the gel fragments have formed.

Suitability of the dried gel fragments for calcination to high-density particles is evidenced by the physical appearance of the particles, in addition to the quantitative volatile nitrate and water content. Suitable fragments prepared in accordance with our invention are opaque and highly vitreous in appearance. If the gel fragments are translucent in sections of one-millimeter thickness the oxide particles produced upon calcination will undergo excessive cracking. If the fragments are granular rather than vitreous, densification of the oxide particles during calcination will be inadequate.

The gel obtained by drying the thorium oxide sol is converted to dense oxide particles by two heating steps. In the first step the gel is heated slowly to a temperature of approximately 450° C. to 575° C., and preferably 500° C. The critical feature in this step is the avoidance of a rapid temperature increase in the temperature range of 150° C. to 450° C., at which temperature the volatile nitrate and water are evolved. The term "slowly heating" in this step means heating at a rate sufficiently low to produce a temperature increase not exceeding approximately 100° C. per hour. Rapid heating in this step results in physical destruction of the oxide particles due to rapid decomposition of the remaining nitrate and evolution of oxides of nitrogen and water. Final calcination is then effected by heating the oxide to a temperature of at least approximately 1150° C., and preferably 1200° C. Rapid heating is required in this step to obtain the desired densification. This step may be readily carried out by inserting the product of the first heating step into a furnace heated to 1200° C. For the preparation of uranium-bearing oxide, calcination may be carried out in a hydrogen atmosphere in order to obtain the uranium in a reduced state.

Oxide particles 1 to 2 millimeters in diameter and approximately 98 percent of theoretical density are obtained by this method at a yield of over 50 percent. The balance of the product comprises smaller, high-density particles which may be employed in combination with the large particles to produce high-density shapes by vibratory compaction. The oxide particles are sufficiently strong to undergo vibratory compaction without appreciable attrition.

The particle size of the product oxide may be varied by adjustment of the gel volatile nitrate and water content and by adjustment of the sol drying temperature within the operable limits stated above for these critical features of our invention. Particle size is increased with decreasing volatile nitrate and water content and is increased with a decrease in the sol drying temperature. Undesirably low particle size in a given batch of material may be corrected by adjustment of these variables.

Our invention is further illustrated by the following specific examples.

*Example I*

Thirty grams of thorium oxide prepared by calcination of thorium oxalate at a temperature of 650° C. was slurried in a solution of 8.6 milliliters of 2 molar thorium nitrate added to 20 milliliters of water. The resulting pasty material was heated at 130° C. for 40 hours. 50 ml. of water was added to the resulting cake, and the cake was reslurried and heated at 135° C. for 16 hours. The cake was again reslurried in 50 ml. of water and heated at 125° C. for 16 hours. The dried cake was then reslurried in 50 ml. of water and evaporated to dryness at 50° C., with 16 hours being required. The resulting solids were in the form of gel fragments 1 to 2 millimeters in diameter, with a volatile nitrate and water content of 6 weight percent. The fragments were heated to 500° C. at a temperature increase rate of 100° C. per hour. A test sample was then fired at 1200° C. for 4 hours, and the density was measured. A density of 10.0 grams per cubic centimeter was obtained. Most of the product oxide particles were approximately one millimeter in diameter.

*Example II*

One hundred grams of thorium oxide prepared by calcination of thorium oxalate at a temperature of 650° C. and 13.1 grams of hydrated uranium trioxide were slurried with 100 ml. of water and 14 ml. of 2 molar thorium nitrate solution. The resulting pasty mixture was dried overnight at 150° C., reslurried in water and redried at 130° C. The cake was then reslurried in 400 ml. of water and dried at 50° C. until dried gel fragments were produced, with 16 hours being required. The combined volatile nitrate and water content of the gel was 4 weight percent. The dried gel fragments were then heated to 500° C. at a temperature increase rate of 100° C. per hour. To samples of the heated fragments were fired, one at 1150° C. and the other at 1250° C., for four hours. The product density was then measured. The oxide fired at 1150° C. had a density of 9.9 grams per cubic centimeter, and the 1250° C. fired oxide had a density of 10.0 grams per cubic centimeter. The particles were observed to be principally at least one millimeter in diameter.

*Example III*

Five hundred grams of thorium oxide prepared by calcination of thorium oxalate at a temperature of 650° C. was slurried with 315 ml. of 2 M thorium nitrate solution. The resulting mixture was evaporated to dryness at 115° C., reslurried in sufficient water to produce a paste, and evaporated again at 115° C. One liter of water containing 2 ml. of 16 M nitric acid was added to the dried solids and the resulting mixture was heated at 50° C. to 60° C. for four hours. The slurry was then evaporated at this temperature for 16 hours, and at 125° C. to dryness, with 8 hours being employed. The dried cake was then reslurried in sufficient water to produce a 2 molar thorium slurry. The slurry was evaporated at 50° C. for 16 hours to produce hard, opaque, vitreous-appearing fragments. These fragments were heated to 500° C. by increasing the temperature 100° C. per hours in 50° C. increments. The heated fragments were then placed in a 1200° C. furnace for 60 hours. The density of the resulting product was 10.0 grams per cubic centimeter. Oxide fragments larger than one millimeter in diameter made up 82 weight percent of the total. These large fragments, when combined with 15 weight percent particles +10, −100 mesh in size and 25 percent particles −200 mesh in size and compacted in tubes by vibratory compaction, gave a bulk compacted density of 8.66 grams per cubic centimeter.

*Example IV*

931 grams of hydrated thorium nitrate was heated to 105° C. in a rotary kiln reactor. Steam at a temperature of 400° C. to 450° C. was introduced into the reactor at a flow rate equivalent to 50 grams of water per minute. In 35 minutes the reactor temperature was thereby increased from 105° C. to 385° C. The reactor was rotated at a rate of two revolution per minute, and the reactor temperature was held at 385° C. for an additional 40 minutes. The resulting thorium oxide had a volatile nitrate and water content of 5.1 weight percent. The resulting oxide, weighing 372.6 grams, was dispersed in 900 milliliters of water, and ammonium diuranate was added to produce a uranium concentration equivalent to 5 mole percent of the metal cations. The resulting mixture was stirred and allowed to set for two hours. The sol formed thereby was evaporated to pasty consistency at 65° C. to 75° C. The pasty mass was then dried at a bed temperature of up to 100° C. until dried gel fragments were formed, after which the bed temperature was increased to over 100° C., the oven temperature being 140° C. The resulting gel fragments were placed in an oven heated to 150° C., and the temperature was increased to 500° C. at a rate not exceeding a 50° C. increase every half hour. The resulting heated oxide was calcined at 1250° C. for four hours in air. Particle size analysis of the calcined product revealed the following: greater than 10 mesh—20 weight percent; 16 to 10 mesh—36 percent; and the balance less than 16 mesh. Thus, 56 weight percent of the particles were millimeter-sized. The density of the product oxide particles was 10.0.

The above examples are illustrative only and are not to be understood as limiting the scope of our invention, which is limited only as indicated by the appended claims. It is also to be understood that numerous variations in apparatus and procedure may be employed by one skilled in the art without departing from the scope of our invention.

Having thus described our invention, we claim:

1. The method of preparing large, high-density thorium oxide particles which comprises forming a gel comprising thorium oxide containing 3.5 to 7 weight percent residual volatiles, said residual volatiles comprising substantially equivalent proportions of nitrate and water, by drying a nitrate-containing thorium oxide sol at a temperature from approximately 50° C. to 100° C., heating said dried gel to a temperature of at least approximately 450° C. at a rate of temperature increase less than approximately 100° C. per hour and rapidly calcining the resulting heated solids at a temperature of at least approximately 1150° C.

2. The method of preparing large, high-density thorium-uranium oxide particles which comprises forming a gel comprising a mixture of thorium oxide and uranium oxide containing 3.5 to 7 weight percent residual volatiles, said mixture comprising at least 90 percent by weight thorium oxide and said residual volatiles comprising substantially equivalent portions of nitrate and water, by drying a nitrate-containing thorium-uranium oxide sol at a temperature from approximately 50° C. to 100° C., heating said dried gel at a temperature of at least approximately 450° C. at a rate of temperature increase less than approximately 100° C. per hour and rapidly calcining the resulting heated solids at a temperature of at least 1150° C.

3. The method of preparing large, high-density thorium oxide particles which comprises contacting thorium nitrate with steam at a temperature under 400° C. until a residual volatile nitrate and water content of the resulting oxide within the range of approximately 3.8 to 5.5 weight percent is obtained, dispersing the resulting oxide in water, whereby a sol is formed, drying said sol at a temperature from approximately 50° C. to 100° C., heating the resulting dried gel to a temperature of at least approximately 450° C. at a rate of temperature increase less than approximately 100° C. per hour, and rapidly calcining the resulting heated oxide at a temperature of at least approximately 1150° C.

4. The method of claim 3 wherein uranium values are provided in said sol in a proportion up to 8 weight percent of said thorium oxide.

5. The method of preparing large, high-density thorium oxide particles which comprises dispersing thorium oxide prepared by calcination of thorium oxalate at a temperature from approximately 650° C. to 800° C. in an aqueous nitrate system at a thorium-to-nitrate molar ratio of approximately 1.9:1 to 3.0:1, evaporating the resulting dispersion at a temperature from approximately 125° C. to 150° C., subjecting the resulting solids to a plurality of repeated cycles, each of said cycles comprising dispersing said solids in water and evaporating the resulting dispersion at a temperature from approximately 125° C. to 150° C. until the volatile nitrate and water content of said solids is within the range of approximately 5 to 7 weight percent and until said solids are capable of forming a sol upon dispersion, dispersing the resulting solids in water, drying the resulting sol at a temperature from approximately 50° C. to 100° C., heating the resulting dried gel to a temperature of at least approximately 450° C. at a rate of temperature increase less than approximately 100° C. per hour and rapidly calcining the resulting heated solids at a temperature of at least approximately 1150° C.

6. The method of claim 5 wherein uranium values are provided in said sol at a proportion up to 8 weight percent of said thorium oxide.

7. The method of claim 5 wherein said dispersion-evaporation cycle is carried out 3 to 5 times.

8. The method of claim 3 wherein said thorium nitrate is contacted with said steam at a temperature within the range of 340° C. to 370° C. until 85 to 90 weight percent of the volatile nitrate and water content is removed from said thorium nitrate.

References Cited in the file of this patent

UNITED STATES PATENTS

| 1,775,640 | Griessbach | Sept. 16, 1930 |
| 2,843,452 | Moore | July 15, 1958 |

FOREIGN PATENTS

| 402,010 | Great Britain | Nov. 23, 1933 |